United States Patent
Inoue et al.

(10) Patent No.: US 6,863,639 B1
(45) Date of Patent: Mar. 8, 2005

(54) CONTROL SYSTEM AND CONTROL METHOD FOR AUTOMATIC TRANSMISSION

(75) Inventors: Naoya Inoue, Fuji (JP); Takashi Shibayama, Fuji (JP); Tatsuo Ochiai, Fuji (JP)

(73) Assignee: JATCO Ltd., Fuji (JP)

( * ) Notice: Subject to any disclaimer, the term of this patent is extended or adjusted under 35 U.S.C. 154(b) by 9 days.

(21) Appl. No.: 10/658,805

(22) Filed: Sep. 10, 2003

(30) Foreign Application Priority Data

Sep. 19, 2002 (JP) ........................................ 2002-273008

(51) Int. Cl.$^7$ .............................................. F16H 61/00
(52) U.S. Cl. ......................................................... 477/116
(58) Field of Search ........................... 477/44, 116, 908, 477/122–3; 701/62; 180/271

(56) References Cited

U.S. PATENT DOCUMENTS

| 4,658,676 | A | * | 4/1987 | Furusawa et al. ........... 477/125 |
| 4,848,529 | A | * | 7/1989 | Kurihara et al. ............. 477/78 |
| 5,103,948 | A | * | 4/1992 | Sato et al. .................. 477/1 |
| 5,211,082 | A | * | 5/1993 | Sasaki et al. ............... 475/122 |
| 5,855,533 | A | * | 1/1999 | Tolkacz et al. .............. 477/120 |
| 6,558,293 | B2 | * | 5/2003 | Skupinski et al. ............ 477/97 |
| 6,726,596 | B2 | * | 4/2004 | Kresse et al. ............... 477/116 |

FOREIGN PATENT DOCUMENTS

JP        405276602 A   * 10/1993    ................ 180/271

\* cited by examiner

*Primary Examiner*—Roger Pang
(74) *Attorney, Agent, or Firm*—Foley & Lardner LLP

(57) ABSTRACT

Disclosed are a control system and a control method for an automatic transmission, in which a judgment is made whether or not a range selector (31) has been switched to a reverse range during forward traveling of the vehicle. When it is determined that the range selector (31) has been switched to the reverse range during forward traveling of the vehicle, a judgment is made whether or not the vehicle speed is lower than a first vehicle speed and whether or not the period of time that has elapsed until switching from the forward to the reverse range is shorter than a predetermined judgment time. When the vehicle speed is lower than the first vehicle speed and the period of time that has elapsed until switching from the forward to the reverse range is shorter than the predetermined judgment time, a forward/backward changeover mechanism (4) is switched to a reverse mode. Otherwise, the switching of the forward/backward changeover mechanism (4) to the reverse mode is delayed.

10 Claims, 2 Drawing Sheets

CONTROL SYSTEM AND CONTROL METHOD FOR AUTOMATIC TRANSMISSION

BACKGROUND OF THE INVENTION

1. Field of the Invention

100021 The present invention relates to a control of an automatic transmission equipped with a forward/backward changeover mechanism.

2. Description of the Related Art

An automatic vehicle transmission is equipped with a forward/backward changeover mechanism for switching the traveling direction according to the operation of a range selector lever. The forward/backward changeover mechanism engages a forward clutch in a forward range and engages a backward clutch in a reverse range. To prevent an abrupt reduction in speed when the range selector lever is erroneously switched to the reverse range during traveling in the forward range, a known technique, according to which the backward clutch is disengaged and when the vehicle speed has been reduced to a safe speed level is then engaged; is available.

SUMMARY OF THE INVENTION

In some cases, a driver intentionally switches to backward during forward traveling. For example, when the vehicle is stuck on a rough road, the driver will try to escape therefrom by moving forwards and backwards repeatedly. In such a case, switching may be effected to the reverse range during traveling in the forward mode, and to the forward range during backward traveling. Apart from this, when garaging the vehicle, the orientation of the vehicle may be changed by repeating forward and backward movements. In this case also, switching may be effected to the reverse range during traveling in the forward range.

However, the above conventional technique, in which, after switching to the reverse range during forward traveling, the backward clutch is not engaged until a safety speed level is reached, has the following problem. When the vehicle speed allowing backward clutch engagement is low, the backward clutch may fail to be engaged although the driver is intentionally trying to move the vehicle backward.

On the other hand, when the vehicle speed allowing backward clutch engagement is high, erroneous operation of the range selector lever during high-speed traveling could result in undesired engagement of the backward clutch, which would cause an excessive torque to be input to the backward clutch, resulting in an abrupt reduction in speed or an engagement shock or in a deterioration in the durability of the clutch.

It is accordingly an object of the present invention to provide a system in which, when a driver operates a shift lever for backward movement, a backward clutch is properly engaged to thereby achieve an enhanced operability and in which, when the driver erroneously operates a range selector lever, the backward clutch is prevented from being engaged to thereby prevent an abrupt reduction in speed or great shock, thereby improving the durability of a forward/backward changeover mechanism.

In accordance with the present invention, a judgment is made whether or not a range selector lever has been switched to a reverse range during forward traveling of a vehicle. When it is determined that the range selector lever has been switched to the reverse range during forward traveling of the vehicle, a judgment is made whether or not the vehicle speed is lower than a first vehicle speed, and whether or not the period of time that has elapsed until the switching from the forward to the reverse range is shorter than a predetermined period of time. When it is determined that the vehicle speed is lower than the first vehicle speed, and that the period of time that has elapsed until the switching from the forward to the reverse range is shorter than the predetermined period of time, a forward/backward changeover mechanism is switched to a backward traveling state. Otherwise, the switching of the forward/backward changeover mechanism to the backward traveling state is delayed.

An embodiment and advantages of the present invention are hereinafter described in detail with reference to the accompanying drawings.

DESCRIPTION OF THE PREFERRED EMBODIMENT

Figure 1:
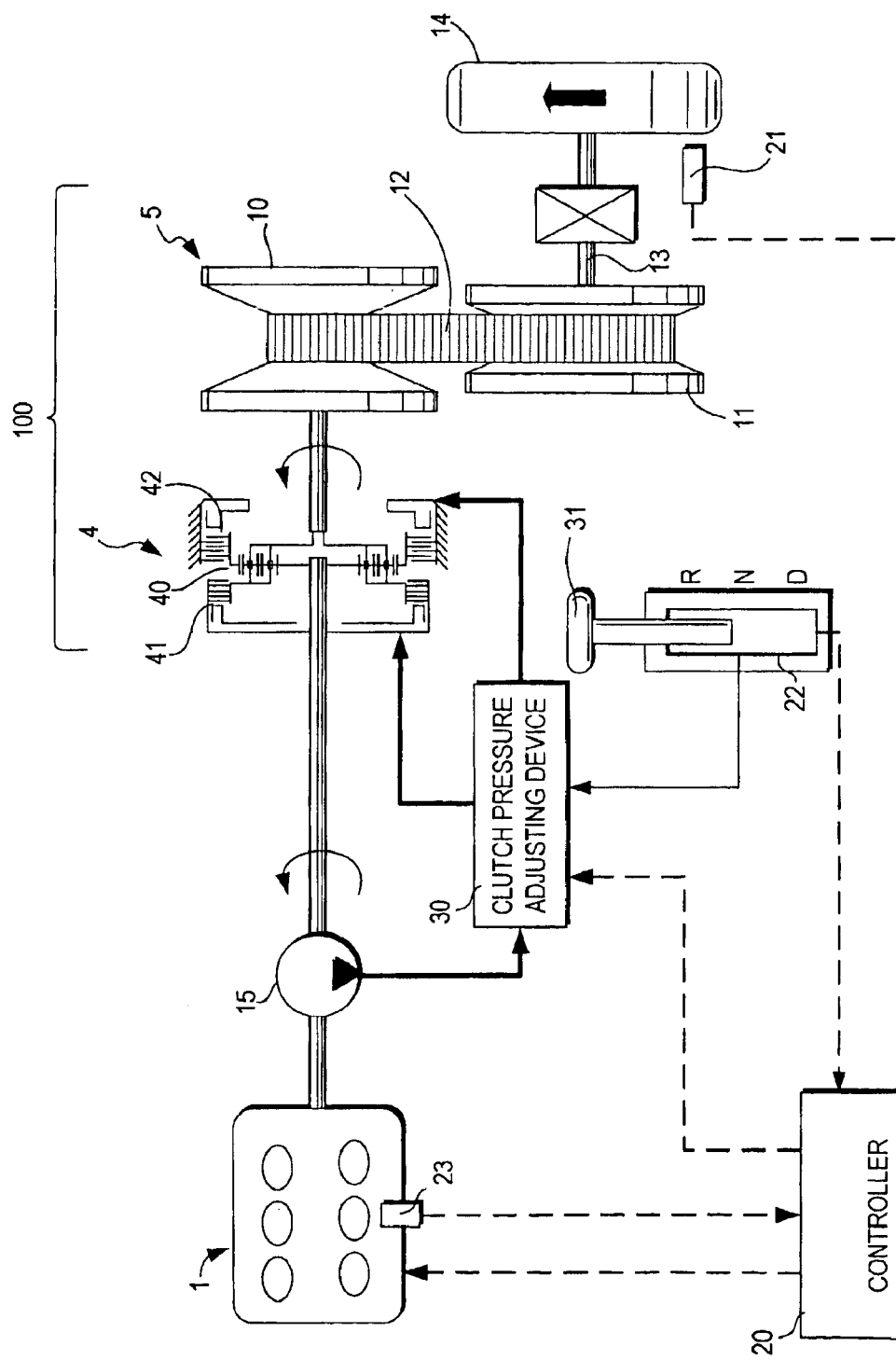
FIG. 1 is a schematic diagram showing an automatic transmission control system according to the present invention.

Referring to FIG. 1, an automatic transmission 100 is equipped with a forward/backward changeover mechanism 4 connected to an engine 1 and a speed change mechanism 5 connected to an output shaft of the forward/backward changeover mechanism 4. The speed change mechanism 5 is a V-belt continuously variable speed change mechanism equipped with a primary pulley 10 connected to an input shaft, a secondary pulley 11 connected to an output shaft 13, and a V-belt 12 wrapped around the pulleys 10 and 11.

The output shaft 13 is connected to drive wheels 14 through an idler gear and a differential gear unit. A torque converter (not shown) is provided between the forward/backward changeover mechanism 4 and the engine 1.

The forward/backward changeover mechanism 4 is equipped with a planetary gear 40, a forward clutch 41, a backward clutch 42, and a clutch pressure adjusting device 30. The clutch pressure adjusting device 30 supplies forward clutch pressure and backward clutch pressure to the forward clutch 41 and the backward clutch 42, respectively, according to an oil pressure command value from a controller 20, engaging or disengaging the forward clutch 41 and the backward clutch 42. The clutch pressure adjusting device 30 adjusts the forward clutch pressure and the backward clutch pressure, using an oil pressure from a hydraulic pump 15 as a base pressure. The engine 1 drives the hydraulic pump 15.

The controller 20 transmits an oil pressure command value to the clutch pressure adjusting device 30 on the basis of signals from a vehicle speed sensor 21 for detecting the vehicle speed, an inhibitor switch 22 for detecting the position of a range selector lever 31, and an engine rotation speed sensor 23 for detecting the rotation speed of the engine, and on the basis of the vehicle running state as input from an engine controller (not shown). The controller 20 contains a counter 25 for measuring elapsed time.

In this embodiment, the range selector lever 31 selects one of forward (D-range), neutral (N-range), and backward (R-range).

The clutch pressure adjusting device 30 never causes the forward clutch 41 and the backward clutch 42 to be engaged simultaneously. That is, during forward traveling (with the range selector lever placed at D-range), the clutch pressure adjusting device 30 supplies an oil pressure to the forward clutch 41 to engage the forward clutch 41, and releases an oil pressure for the backward clutch 42 to disengage the backward clutch 42 (forward mode). During backward traveling (with the range selector lever placed at R-range), an oil pressure for the forward clutch 41 is released to disengage the forward clutch 41, and supplies an oil pressure to the backward clutch 42 to engage the backward clutch 42 (reverse mode). In the neutral state (with the range selector lever placed at N-range), oil pressures for the forward clutch 41 and the backward clutch 42 are both released, disengaging both the forward clutch 41 and the backward clutch 42.

A hydraulic controller (not shown) operating upon command from the controller 20 controls a speed ratio of the speed change mechanism 5 and a contact frictional force of the V-belt 12.

Figure 2:
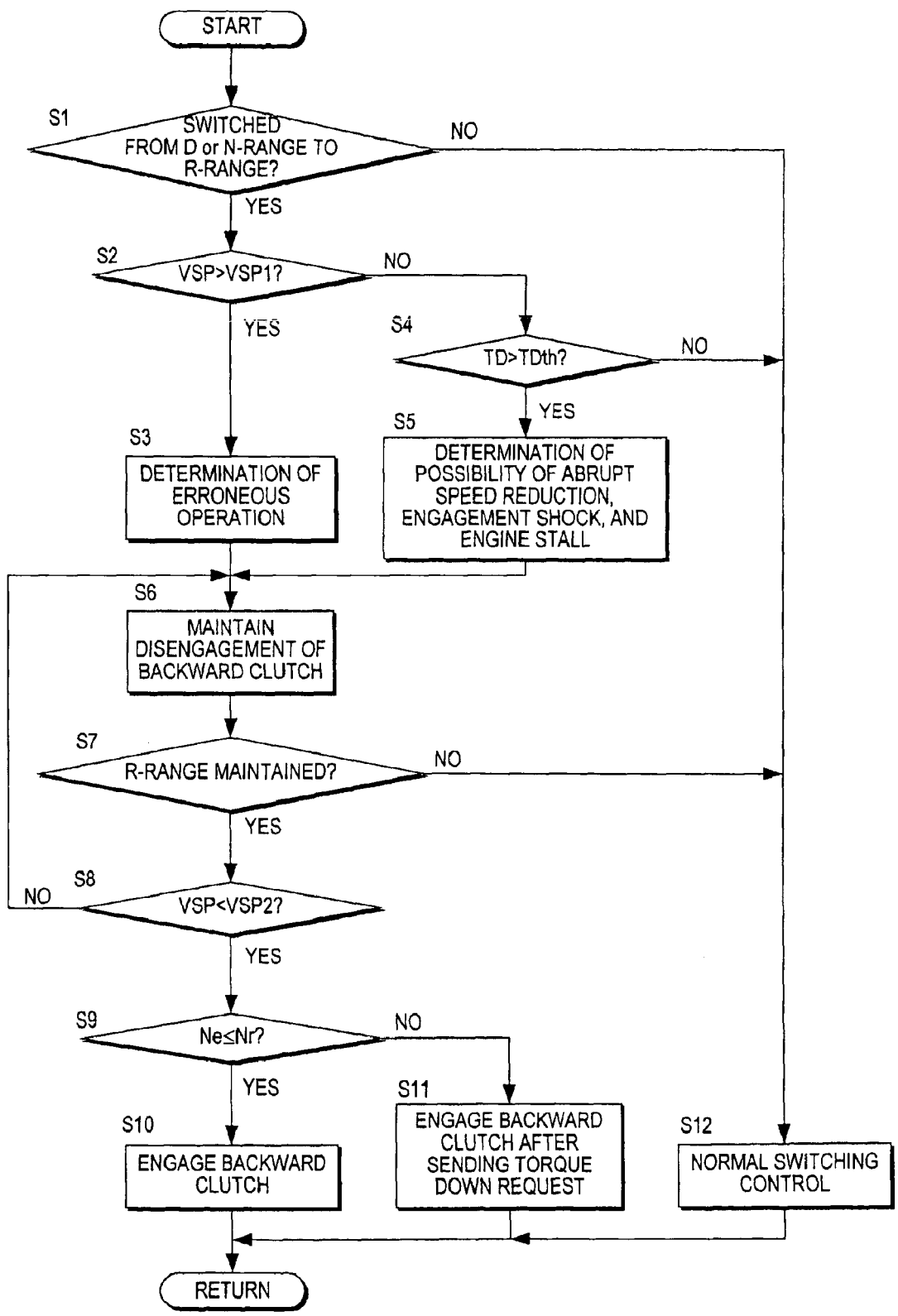
FIG. 2 is a flowchart illustrating engagement control for forward and backward clutches.

FIG. 2 is a flowchart illustrating the forward/backward switching control. The operations as set forth on this flowchart are executed every predetermined period of time (e.g., several tens of msec).

First, in step S1, the range selector lever position detected by the inhibitor switch 22 is read. Then, a judgment is made whether or not the range selector lever position has been switched from the forward range (hereinafter referred to as D-range) or the neutral position (hereinafter referred to as N-range) to the reverse range (hereinafter referred to as R-range). That is, a judgment is made whether the range selector lever position at the time of previous execution was other than R-range and has been changed to R-range.

In the case in which the range selector lever position has been switched to R-range from D-range or N-range, the procedure advances to step S2. Otherwise, the procedure advances to step S12.

In step S12, the forward clutch 41 or the backward clutch 42 is engaged or disengaged according to the position of the range selector lever (or the traveling direction of the vehicle) (normal switching control).

In step S2, a judgment is made whether or not the range selector lever 31 has been switched to R-range through erroneous operation. When a detected vehicle speed VSP is higher than a first predetermined value VSP1 (e.g., 15 km/hour), the procedure advances to step S3, where it is determined that the range selector lever 31 has been erroneously operated. The procedure further advances to step S6, where the disengagement of the backward clutch 42 is maintained (engagement thereof is prohibited).

The vehicle speed VSP1 is set to a lower vehicle speed limit at which a driver is quite unlikely to switch the range selector lever 31 to R-range. In other words, when the vehicle speed VSP is higher than the vehicle speed VSP1, it is usually very unlikely that the driver intentionally switches the range selector lever 31 to R-range. In the case in which the range selector lever 31 has been switched to R-range when the vehicle speed VSP is higher than the vehicle speed VSP1, it is quite likely that the range selector lever 31 has been erroneously operated.

When the vehicle speed VSP is lower than the first predetermined value VSP1, there is little likelihood that the range selector lever 31 has been erroneously operated. Thus, the procedure advances to step S4 of inferring the intention of the driver.

In step S4, a judgment is made, whether or not the period of time TD that the vehicle has traveled in D-range immediately before switching to R-range is longer than a predetermined period of time TDth (e.g., 10 seconds). When the period of time that the vehicle has traveled in D-range is shorter than the predetermined period of time TDth, it is determined that the driver has switched from D-range to R-range not through erroneous operation but through intentional operation, and the procedure advances to step S12, where the clutch to be engaged is switched from the forward clutch 41 to the backward clutch 42.

When D-range is selected, the traveling time TD in D-range starts to be measured by the counter 25 contained in the control unit 20. At the point of time when switching from N-range or R-range to D-range is effected, the counter 25 is reset to zero to start counting anew.

When the traveling time TD in D-range is longer than the predetermined period of time TDth, the procedure advances to step S5. In step S5, it is determined that the vehicle speed VSP is lower than the predetermined value VSP1 but that switching of the clutch to be engaged from the forward clutch 41 to the backward clutch 42 can cause an abrupt reduction in speed, an engagement shock, and an engine stall, the procedure advancing to step S6, where the disengagement of the backward clutch 42 is maintained.

In step S7, a judgment is made whether or not the range selector lever position is maintained at R-range. When the range selector lever position has been switched to other than R-range, it means it has been switched to either D-range or N-range, so that the procedure advances to step S12, where normal switching control is performed according to the range selector lever position.

On the other hand, when it is determined in step S7 that the range selector lever position is still R-range, the procedure advances to step S8. In step S8, the current vehicle speed VSP is read, and a judgment is made whether or not the vehicle speed VSP has become lower than a second predetermined value VSP2 (e.g., 7 to 8 km/hour) allowing the clutch to be engaged to be switched from the forward clutch 41 to the backward clutch 42.

The procedures of steps S6 through S8 are repeated until the vehicle speed VSP becomes lower than the predetermined value VSP2. When the vehicle speed VSP becomes lower than the second predetermined value VSP2, the procedure advances to step S9.

The second predetermined value VSP2 is set at a different value according to the vehicle. The second predetermined value VSP2 is set according to the inertia of the drive system, vehicle weight, etc. The second predetermined value VSP2 is set to an upper limit of vehicle speed that involves no speed reduction or shock exceeding a permissible limit even when the backward clutch 42 is engaged during forward traveling of the vehicle and therefore the backward clutch 42 may suffer no damage. That is, even if the backward clutch 42 is engaged when the vehicle is traveling forward at a speed lower than the second predetermined value VSP2, no speed reduction or shock exceeding the permissible limit occurs to damage the backward clutch 42.

In step S9, the rotating speed Ne of the engine 1 is read. Then, the engine rotating speed Ne is compared with a predetermined value Nr for racing judgment to make a judgment whether or not the engine 1 is in the racing state or not. The predetermined value Nr for racing judgment is set, for example, at 2000 rpm, which is the upper limit of the rotating speed capable of suppressing shock even when the backward clutch 42 is engaged. That is, when the engine rotating speed Ne is lower than the predetermined value Nr for racing judgment, it is possible to suppress shock even when the backward clutch 42 is engaged.

When the current engine rotating speed Ne is lower than the racing judgment value Nr, the procedure advances to step S10, where the backward clutch 42 is engaged. In contrast, when the engine rotating speed Ne is above the racing judgment value Nr, the procedure advances to step S11, where a torque down request signal is transmitted to the engine 1 (or, more exactly, the controller of the engine 1). Thereafter, the backward clutch 42 is engaged.

When it receives the torque down request signal from the control unit 20 the engine 1 performs procedures for reducing torque, such as fuel injection cutting, ignition timing retarding, and intake air amount reduction, to thereby reduce the rotating speed and torque, suppressing the shock when the backward clutch 42 is engaged.

Due to the above control, when the driver intentionally repeats forward and backward movements to get out of stuck or perform garaging, the vehicle speed VSP at the point of time when switching is effected form a range other than R-range to R-range is lower than the first predetermined value VSP1, and the period of time that the vehicle has traveled in D-range is shorter than the predetermined time TDth. Thus, it is determined that, even when the clutch to be engaged is switched from the forward clutch 41 to the backward clutch 42, it is possible to restrain occurrence of abrupt speed reduction, engagement shock, and engine stall, and the backward clutch 42 is engaged in accordance with the intention of the driver.

In contrast, when the vehicle speed VSP at the point of time when switching to R-range is effected is higher than the first predetermined value VSP1, it is determined that the switching to R-range has been effected through erroneous operation of the range selector lever 31, and a reduction in the vehicle speed VSP to a level lower than the second predetermined value VSP2 is waited for. Further, the backward clutch 42 is engaged only when the engine rotating speed Ne is lower than the racing judgment value Nr, whereby it is possible to engage the backward clutch 42 without involving abrupt speed reduction or engagement shock.

When the engine rotating speed Ne, upon engaging the backward clutch 42, exceeds the racing judgment value Nr, the torque of the engine 1 is reduced, and then the backward clutch 42 is engaged, whereby it is possible to prevent generation of great shock due to engagement of the backward clutch 42 when the engine rotating speed Ne is high.

Further, even when the vehicle speed VSP, upon switching to R-range is effected, is lower than the first predetermined value VSP1, when the period of time TD that the vehicle has traveled forwards in D-range is longer than the predetermined period of time TDth, it is very likely that the range selector lever has been erroneously operated despite the intention of the driver to travel forwards, and therefore control operation similar to the above is conducted in order to prevent engine stall, engagement shock, etc. In this way, it is possible to prevent occurrence of abrupt speed reduction, engagement shock, and engine stall due to engagement of the backward clutch 42. Further, it is possible to prevent damage to the backward clutch 42.

In this way, a judgment is made whether or not the driver has intentionally operated the range selector lever or the range selector lever has been erroneously operated, taking into account not only the vehicle speed when switching to R-range from a range other than R-range was effected but also the length of time that the vehicle had traveled forwards before the switching. Thus, in the case of erroneous operation of the range selector lever, engagement control is performed on the backward clutch 42 so as not to involve generation of abrupt speed reduction, great engagement shock, etc. In the case where escaping from stuck is to be effected, switching between forward and backward traveling is effected quickly, making it possible to switch the traveling direction as desired by the driver.

While in the above-described embodiment a V-belt continuously variable speed change mechanism is used, it is also possible to use toroidal continuous variable speed change mechanism. Further, it is not always necessary for the speed change mechanism to be of the stepless type. It is also possible to adopt a step speed change mechanism using a planetary gear.

Further, while in the above-described embodiment the range selector lever selects one of D-range, N-range, and R-range, it is also possible for the range selector lever to select other ranges. For example, the forward ranges may include L-range (traveling with 1st gear alone), 2-range (traveling with 1st and 2nd gears alone), Ds-range (sport traveling mode), and M-range (manual mode). In the case where these ranges are included, the above control is also conducted when the range selector lever position is switched to R-range from one of these ranges.

Further, while in the above-described embodiment the rotating direction of the drive wheel is switched by the forward/backward changeover mechanism 4, when the vehicle is a hybrid vehicle, an electric automobile, or a fuel cell powered vehicle, the engagement control for the forward and backward clutches is replaced by a control for switching the rotating direction of the motor.

This application claims priority from Japanese Patent Application 2002-273008, filed Sep. 19, 2002, which is incorporated herein by reference in its entirety.

What is claimed is:

1. A control system for an automatic transmission, comprising:

a forward/backward changeover mechanism for switching between a forward mode for causing a vehicle to travel forwards and a reverse mode for causing the vehicle to travel backwards;

a detecting device which detects a vehicle speed;

a range selector which selects one of a forward range and a reverse range;

a detecting device which detects a position of the range selector;

a counter which measures a period of time that the range selector has continued to remain at the forward range; and a controller functioning to:

make a judgment whether or not the range selector has been switched to a reverse range during forward traveling of the vehicle, make a judgment whether or not the detected vehicle speed is lower than a first vehicle speed and whether or not the period of time that the range selector has remained at the forward range until switching is shorter than a predetermined judgment time when it is determined during forward traveling of the vehicle that the range selector has been switched to the reverse range, and switch the forward/backward changeover mechanism to the reverse mode when it is determined that the detected vehicle speed is lower than the first vehicle speed and that the period of time that the range selector has continued to remain at the forward range until switching is shorter than the predetermined judgment time, and, otherwise, delay the switching of the forward/backward changeover mechanism to the reverse mode.

2. A control system according to claim 1, wherein the controller further functions such that, when it is determined that a detected vehicle speed is lower than the first vehicle speed and that the period of time that the range selector has continued to remain at the forward range until switching exceeds the predetermined judgment time, the switching of the forward/backward changeover mechanism to the reverse mode is delayed until the detected vehicle speed becomes lower than a second vehicle speed that is lower than the first vehicle speed.

3. A control system according to claim 1, wherein the controller further functions such that, when it is determined that a detected vehicle speed exceeds the first vehicle speed, the switching of the forward/backward changeover mechanism to the reverse mode is delayed until the detected vehicle speed becomes lower than a second vehicle speed that is lower than the first vehicle speed.

4. A control system according to claim 1, wherein
the forward/backward changeover mechanism comprises
a forward frictional engagement element engaged for causing the vehicle to travel forwards,
a backward frictional engagement element engaged for causing the vehicle to travel backwards, and
an oil pressure adjusting mechanism for controlling an oil pressure supplied to the forward frictional engagement element and an oil pressure supplied to the backward frictional engagement element, wherein
the forward/backward changeover mechanism switches between the forward mode for causing the vehicle to travel forwards and the reverse mode for causing the vehicle to travel backwards by controlling the oil pressure supplied to the forward frictional engagement element and the oil pressure supplied to the backward frictional engagement element.

5. A control system according to claim 4, further comprising a detecting device which detects a rotation speed of an engine, wherein
the controller further functions to:
when the engine rotation speed has become lower than a second vehicle speed which is lower than the first vehicle speed, if the engine rotation speed exceeds a racing judgment value, reduce a torque of the engine, and then switch the forward/backward changeover mechanism to the reverse mode.

6. A control system according to claim 1, wherein the first vehicle speed is set to a lower vehicle speed limit at which a driver is expected not to switch the range selector to the reverse range.

7. A control system according to claim 2, wherein the second vehicle speed is set to an upper vehicle speed limit at which no speed reduction exceeding a permissible limit is caused even when forward/backward changeover mechanism is switched to the reverse mode during forward traveling of the vehicle.

8. A control system according to claim 3, wherein the second vehicle speed is set to an upper vehicle speed limit at which no speed reduction exceeding a permissible limit is caused even when forward/backward changeover mechanism is switched to the reverse mode during forward traveling of the vehicle.

9. A control system according to claim 5, wherein the second vehicle speed is set to an upper vehicle speed limit at which no speed reduction exceeding a permissible limit is caused even when forward/backward changeover mechanism is switched to the reverse mode during forward traveling of the vehicle.

10. A method of controlling an automatic transmission having a forward/backward changeover mechanism which switches between a forward mode for causing a vehicle to travel forwards and a reverse mode for causing the vehicle to travel backwards, and a range selector which selects one of a forward range and a reverse range, the method comprising:
making a judgment whether or not the range selector has been switched to the reverse range during forward traveling of the vehicle,
making a judgment whether or not a vehicle speed is lower than a first vehicle speed and whether or not the period of time that the range selector has remained at the forward range until switching is shorter than a predetermined judgment time when it is determined during forward traveling of the vehicle that the range selector has been switched to the reverse range, and
switching the forward/backward changeover mechanism to the reverse mode when it is determined that the vehicle speed is lower than the first vehicle speed and that the period of time that the range selector has continued to remain at the forward range until switching is shorter than the predetermined judgment time, and, otherwise, delaying the switching of the forward/backward changeover mechanism to the reverse mode.

* * * * *